United States Patent
Liu et al.

(10) Patent No.: US 12,498,967 B2
(45) Date of Patent: Dec. 16, 2025

(54) CHANNEL SWITCHING MECHANISM AMONG WIRELESS PERIPHERAL DEVICES

(71) Applicant: Dell Products L.P., Round Rock, TX (US)

(72) Inventors: JuiChang Liu, New Taipei (TW); Boon Kiat Law, Singapore (SG)

(73) Assignee: Dell Products L.P., Round Rock, TX (US)

( * ) Notice: Subject to any disclaimer, the term of this patent is extended or adjusted under 35 U.S.C. 154(b) by 619 days.

(21) Appl. No.: 17/948,328

(22) Filed: Sep. 20, 2022

(65) Prior Publication Data

US 2023/0289213 A1    Sep. 14, 2023

(51) Int. Cl.
G06F 9/455     (2018.01)
G06F 3/06      (2006.01)
G06F 9/48      (2006.01)

(52) U.S. Cl.
CPC .......... *G06F 9/4856* (2013.01); *G06F 3/0647* (2013.01)

(58) Field of Classification Search
CPC .................................................... G06F 9/4856
USPC ............................................................ 718/1
See application file for complete search history.

(56) References Cited

U.S. PATENT DOCUMENTS

| | | | | |
|---|---|---|---|---|
| 9,065,863 B1* | 6/2015 | Tharakan | ............ | H04L 61/4511 |
| 10,939,289 B1* | 3/2021 | Krishnakumar | ...... | H04W 76/15 |
| 11,194,374 B2* | 12/2021 | Hamlin | ................. | G06F 1/3293 |
| 12,095,869 B2* | 9/2024 | Fu | ........................... | H04L 67/131 |
| 12,284,288 B1* | 4/2025 | Winklevoss | .......... | H04L 9/3239 |
| 2008/0104284 A1* | 5/2008 | Chuang | ................. | G06F 13/385 710/12 |
| 2012/0023265 A1* | 1/2012 | Liao | ....................... | G06F 13/387 710/5 |
| 2012/0083208 A1* | 4/2012 | Giles | ...................... | G06F 13/387 455/41.2 |
| 2012/0083209 A1* | 4/2012 | Giles | ................... | H04W 12/082 455/41.2 |
| 2012/0284449 A1* | 11/2012 | Tung | ........................ | G06F 3/023 710/316 |
| 2014/0064258 A1* | 3/2014 | Montag | ................. | H04W 84/12 370/338 |
| 2015/0011164 A1* | 1/2015 | Chen | ...................... | H05B 45/00 455/41.2 |
| 2017/0339189 A1* | 11/2017 | Leong | .................... | H04L 63/101 |
| 2019/0012277 A1* | 1/2019 | Wendt | ..................... | G06F 13/102 |
| 2019/0089624 A1* | 3/2019 | Berchanskiy | ........... | H04L 45/22 |
| 2020/0026533 A1* | 1/2020 | Gehlsen | .................. | G06F 9/451 |
| 2022/0058148 A1* | 2/2022 | Wei | ....................... | G06F 13/102 |
| 2022/0078607 A1* | 3/2022 | Link | ...................... | H04W 12/03 |
| 2022/0253089 A1* | 8/2022 | Lei | ......................... | G06F 3/0489 |
| 2022/0330029 A1* | 10/2022 | Wang | .................. | H04W 12/108 |
| 2023/0208892 A1* | 6/2023 | Goldfish | ............... | G06F 13/102 455/41.2 |
| 2023/0269789 A1* | 8/2023 | Azam | ................... | H04W 48/18 370/329 |
| 2023/0289213 A1* | 9/2023 | Liu | ......................... | G06F 3/165 |

(Continued)

Primary Examiner — Mehran Kamran
(74) Attorney, Agent, or Firm — Larson Newman, LLP (57) ABSTRACT

A wireless communication system detects a signal triggered by a user manipulation to switch from a first host to a second host, whereupon the first wireless peripheral device disconnects from the first host and re-connecting to the second host, and transmits to the second wireless peripheral device a request to switch from the first host to the second host.

20 Claims, 9 Drawing Sheets

(56) References Cited

U.S. PATENT DOCUMENTS

2023/0308976 A1\* 9/2023 Chan ..................... H04W 36/18
2023/0350816 A1\* 11/2023 Thiruchengode Vajravel ............
                                                      G06F 13/10
2023/0388385 A1\* 11/2023 Fu ........................... H04L 69/40
2025/0007901 A1\* 1/2025 Bourne ................... H04W 4/70

\* cited by examiner

CHANNEL SWITCHING MECHANISM AMONG WIRELESS PERIPHERAL DEVICES

FIELD OF THE DISCLOSURE

The present disclosure generally relates to information handling systems, and more particularly relates to channel switching mechanisms among wireless peripheral devices.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A wireless communication system detects a signal triggered by a user manipulation to switch from a first host to a second host, whereupon the first wireless peripheral device disconnects from the first host and re-connecting to the second host, and transmits to the second wireless peripheral device a request to switch from the first host to the second host.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
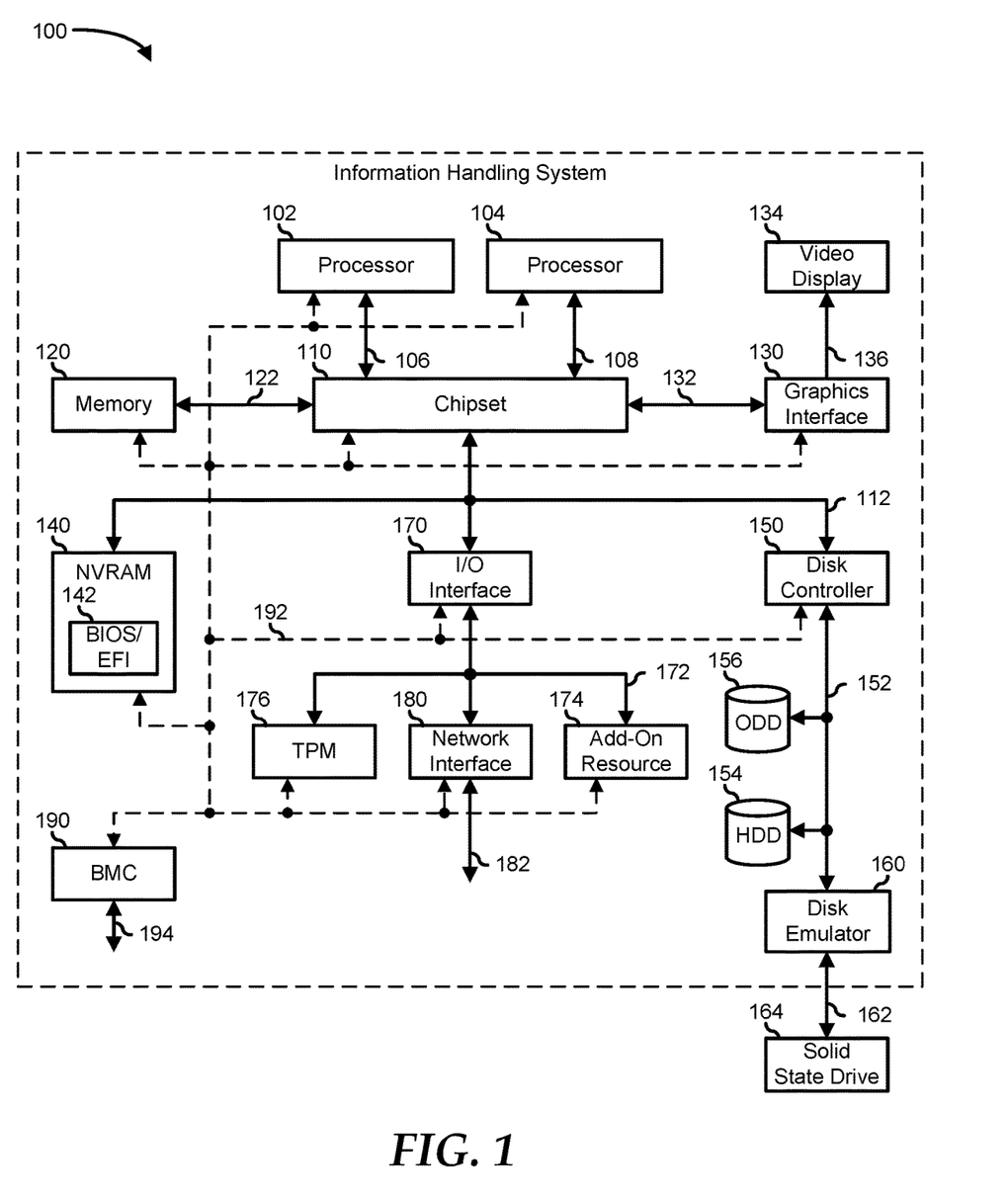
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional buses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Manufacturers currently provide multi-mode wireless peripherals such as keyboards, mice, and audio headsets that can pair and connect to multiple hosts. For example a keyboard and mouse pair can connect to a server, desktop, smartphone, notepad, laptop, etc. Once the peripherals are paired to the different hosts, a user can switch across the different hosts by switching between wireless channels. This is typically done by pressing a physical button, also referred to herein as a mode switch button or channel switch button, on the wireless peripherals.

However because a typical user may operate multiple peripherals at the same time, having to press the channel switch button on each of the peripherals every time the user switches to a different host can be tedious. For example if a software programmer wants to switch from a UNIX host to a Windows® host, the software programmer has to press the channel switch button of the keyboard, the mouse, and the headset. In addition these channel switch buttons may be located in inconvenient places, such as the underside of the mouse.

To address this and other issues, the present disclosure allows the other peripheral to follow a peripheral when such peripheral switches host. For example when the user who uses a keyboard, mouse, and audio headset presses the channel switch button on the keyboard to switch from host A to host B, the mouse and the audio headset follow suit automatically. That is the mouse and audio headset switch from host A to host B as well without additional user interaction. Similarly the user can press the mode switch button in the audio headset to switch the host from host A to host B, and the mouse and keyboard also automatically switch from host A to host B. As used herein, switching from a first host to a second host includes disconnecting from the first host and re-connecting to the second host.

Figure 2:
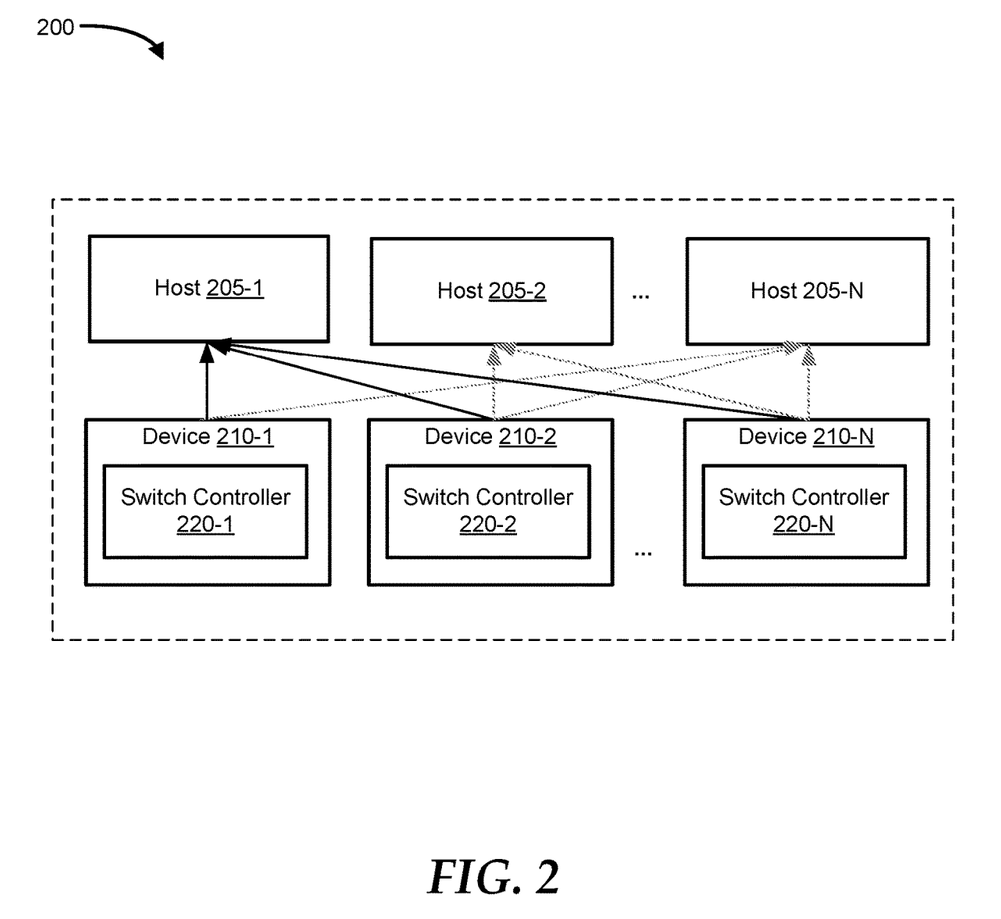
FIG. 2 is a block diagram illustrating a system for channel switching mechanisms among wireless peripheral devices, according to an embodiment of the present disclosure.

FIG. 2 illustrates a wireless communication system 200 for channel switching mechanism among wireless peripheral devices. Wireless communication system 200 includes host 205-1 through host 205-N (also referred to herein as hosts 205 or host 205) and devices 210-1 through 210-N (also referred to herein as devices 210 or device 210). Each one of devices 210 includes a switch controller. As such device 210-1 includes a switch controller 220-1, device 210-2 includes switch controller 220-2, and so on. The components of wireless communication system 200 may be implemented in hardware, software, firmware, or any combination thereof. In various embodiments, wireless communication system 200 may not include each of the components shown in FIG. 2. Additionally, or alternatively, wireless communication system 200 may include various additional components in addition to those that are shown in FIG. 2. Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip.

Each of hosts 205 may be an information handling system similar to information handling system 100 of FIG. 1. Host 205 may be one of a computing device, desktop computer, notepad computer, smartphone, laptop computer, server, notebook computer, or any suitable information handling system. Hosts 205 may each different operating system platforms and related software stacks.

Devices 210 may be wireless peripheral devices that interact and/or are associated with hosts 205, such as a mouse, keyboard, headphone, headset, game pad, printer, graphics tablet, image scanner, barcode reader, loudspeaker, etc. For example, each one of devices 210 may be Bluetooth® enabled device. Bluetooth® is a wireless technology standard used for exchanging data between information handling systems and peripheral devices over short distances using short-wavelength ultra high-frequency radio waves in the industrial, scientific, and medical radio bands from 2.400 to 2.485 gigahertz, and for building personal area networks.

In one embodiment, the present disclosure may leverage a Bluetooth Low Energy® (BLE) advertisement stage to facilitate peer-to-peer communication between devices 210. For example, the present disclosure may customize a payload field in the advertisement packet to have devices 210 identify each other and enable the channel or host re-connection switching function. As used herein, a channel switching mechanism may also refer to a host switching mechanism, wherein a device disconnects from one channel/host and re-connects to another channel/host. In one example, when a user manually triggers device 210-1 to switch from host 205-1 and re-connect to host 205-2, the other devices 210 are made aware of this change and dynamically disconnect from host 205-1 and reconnect to host 205-2 without another user intervention.

Switch controller 220 may be a microcontroller integrated circuit that is configured to execute the channel switching mechanism implemented in the present disclosure. In one embodiment, switch controller 220 may be configured to execute a peripheral device signaling protocol which may be used by devices 210 to communicate with other wireless peripheral devices. For example, the peripheral device signaling protocol may be used during a grouping identification process, wherein device 210-1 may determine which group of wireless peripheral devices it belongs to, if any, upon successful pairing with one or more hosts. In a particular example, devices 210 that are paired with identical hosts can belong to one group.

When devices 210 belong to one group, a peer-to-peer connection between each of devices 210 may be established. In another embodiment, a user may disable this process in one or more of devices 210, such that this device may not join the group. After devices 210 have been paired with their hosts, a peripheral device signaling protocol may be suspended or deactivated and may be activated when the user presses a control switching button in one of devices 210.

When activated, the peripheral device signaling protocol may be used by device 210 with the central role to transmit a scan request packet to discover other wireless peripheral devices. Device 210 may assume the central role when a user presses its channel-switching button. The peripheral device signaling protocol may be configured to adapt a cryptographic authentication technique and/or encryption/decryption algorithm. For example, the peripheral device signaling protocol may authenticate responses using a hash-based message authentication code and/or advanced encryption standard algorithm, wherein the protocol may use a one-time based secret acknowledgment.

Those of ordinary skill in the art will appreciate that the configuration, hardware, and/or software components of wireless communication system 200 depicted in FIG. 2 may vary. For example, the illustrative components within wireless communication system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
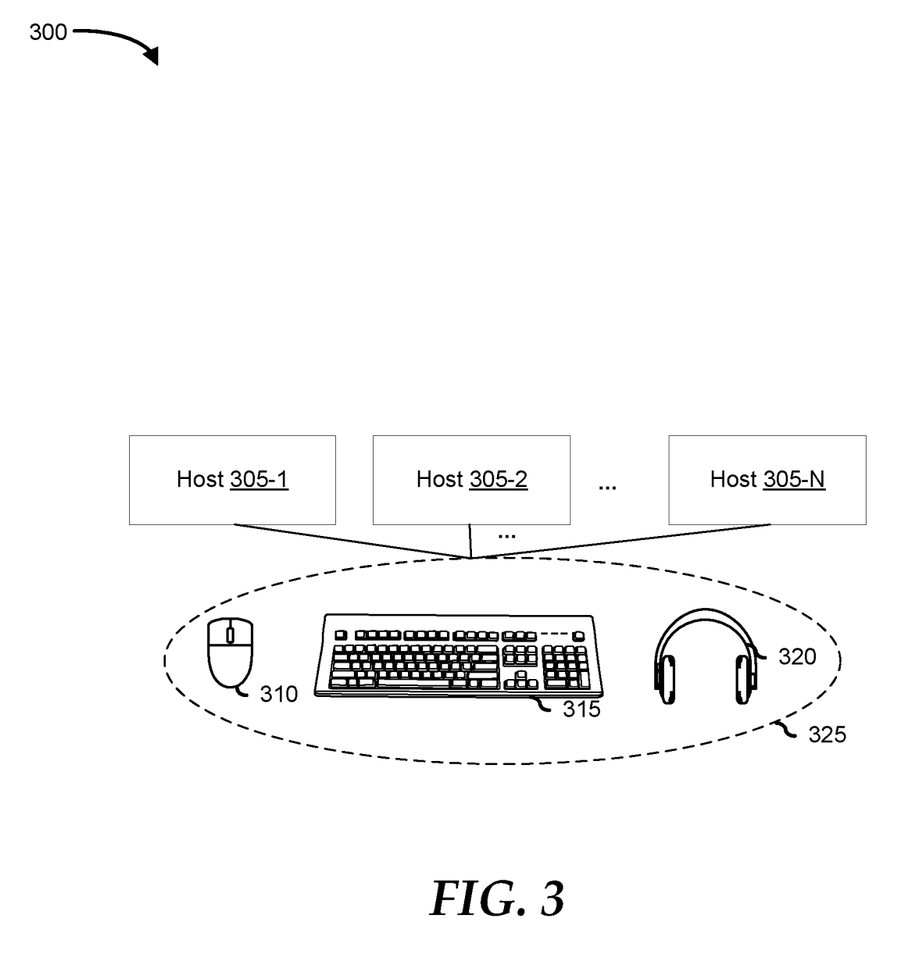
FIG. 3 is a block diagram illustrating an environment configured for channel switching mechanisms among wireless peripheral devices, according to an embodiment of the present disclosure.

FIG. 3 shows an environment 300 with a host switching mechanism among wireless peripheral devices. Environment 300 includes a group of wireless peripheral devices 325 (also referred to herein as group 325) and a host 305-1 through host 305-N, also referred to herein as hosts 305 or host 305. Group 325 includes a mouse 310, a keyboard 315, and a headset 320. Group 325 may also include a graphic tablet, image scanner, barcode reader, stylus, camera, webcam, game pad, monitor, projector, printer, speaker, etc. Each of hosts 305 may be an information handling system similar to host 205 of FIG. 2. For example, a host may be a smartphone, tablet computer, notebook computer, 2-in-1 tablet-laptop combination computer, a desktop, a server, etc. Further, each one of hosts 305 may be the same or different operating system platforms, such as Microsoft Windows®, Apple iOS®, Android®, Linux®, etc. In addition, each of hosts 305 may include a software application configured to interact with one or more wireless peripheral devices in group 325. Further, each one of the wireless peripheral devices in group 325 may be configured to communicate with hosts 305 using any suitable wireless protocol, such as Bluetooth®, Bluetooth Low Energy® (BLE), or the like. As such, each one of the wireless peripheral devices in group 325 can pair and/or connect to each one of hosts 305.

Figure 4:
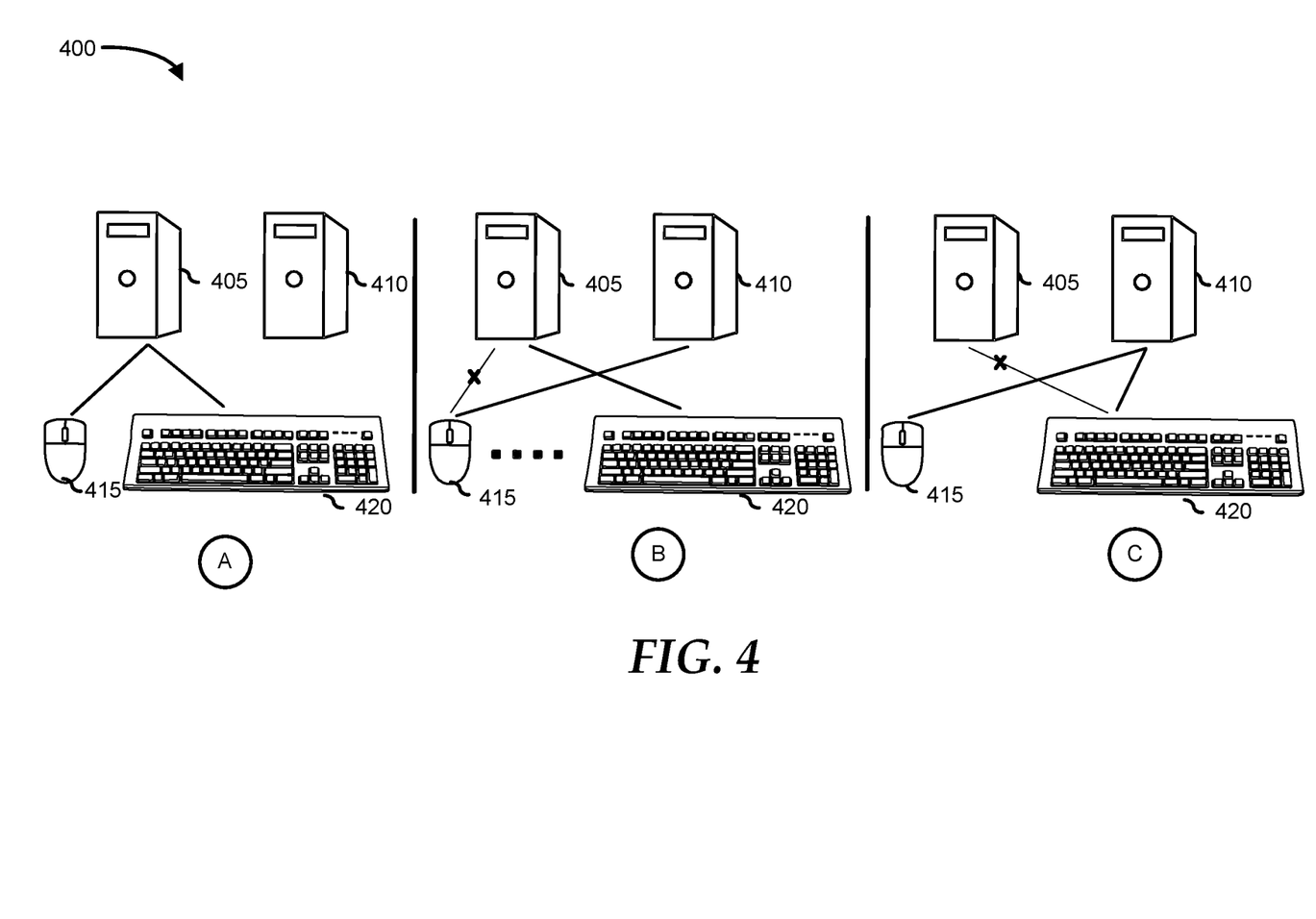
FIG. 4 is a block diagram illustrating a channel switching mechanism among wireless peripheral devices, according to an embodiment of the present disclosure.

FIG. 4 shows an environment 400 with a host switching mechanism among wireless peripheral devices. Environment 400 includes a mouse 415 and a keyboard 420 which are wireless peripheral devices that are associated or paired with host 405 and host 410. Host 405 and host 410 are similar to hosts 305 of FIG. 3. FIG. 4 is annotated with a series of letters A, B, and C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, both mouse 415 and keyboard 420 may be connected to host 405 using the host address of host 405. In addition, prior to stage A, both mouse 415 and keyboard 420 may have been paired with host 405 and host 410. Also, mouse 415 and keyboard 420 may or may not have been paired with the aforementioned hosts as a group. At stage B, a user manually switches the connection of mouse 415 from host 405 to host 410. Subsequently, mouse 415 and keyboard 420 may start communicating, wherein mouse 415 may provide keyboard 420 with the connection information of host 410 which includes the host address of host 410. At stage C, keyboard 420 may confirm that it was previously paired and/or connected to host 410 and that it is in the same group as mouse 415. After confirmation, keyboard 420 may disconnect from host 405 and re-connect to host 410.

Figure 5:
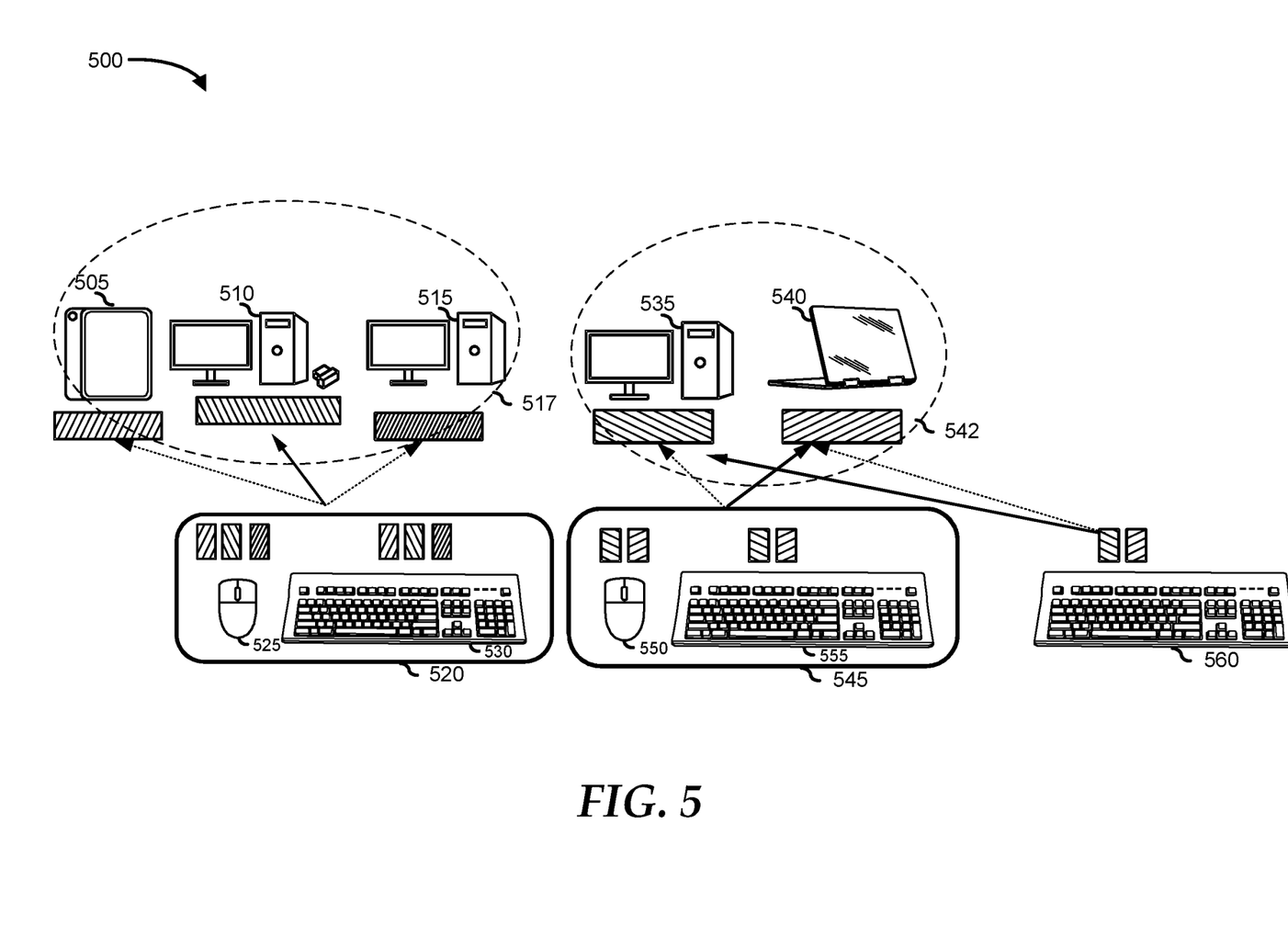
FIG. 5 is a block diagram illustrating an environment configured for channel switching mechanisms among wireless peripheral devices, according to an embodiment of the present disclosure.

FIG. 5 shows an environment 500 with a host switching mechanism among wireless peripheral devices. In this example, environment 500 includes a group of wireless peripheral devices 520 (also referred to simply as group 520), a group of wireless peripheral devices 545 (also referred to simply as group 545), and a keyboard 560. Environment 500 also includes a set of hosts 517 and a set of hosts 542. Set of hosts 517 includes a host 505, a host 510, and a host 515. Each of the hosts in environment 500 may be similar to host 305 of FIG. 3.

In this example, host 505 may be a tablet computer, while host 510 and host 515 are desktop computers. Set of hosts 542 includes a host 535 and a host 540. In this example, host 535 is a desktop computer while host 540 is a laptop computer. Group 520 includes a mouse 525 and a keyboard 530. Group 545 includes a mouse 550 and a keyboard 555. Both mice and keyboards depicted herein are wireless peripheral devices. Set of hosts 517 may be located proximately to set of hosts 542. Accordingly, group 520, group 545, and keyboard 560 may also be located proximately to each other. In one example, set of hosts 517 may be used by a first user via group 520 while set of hosts 542 may be used by a second user using group 545. The first user and the second user may each be seated in proximate office cubicles. However, the present disclosure is not limited by this example. Mouse 525 and keyboard 530 may have been paired as a group with host 505, host 510, and host 515 using a wireless protocol. For example, mouse 525 and keyboard 530 may have been paired with host 505 and host 515 using Bluetooth®, BLE protocol, or the like. While mouse 525 and keyboard 530 may have been paired as a group with host 510 using a USB protocol or similar via a wireless transceiver of a detachable dongle that fits into a USB port of host 510. In this example, mouse 525 and keyboard 530 are currently connected to host 510.

Similarly, mouse 550 and keyboard 555 may have been paired as a group with host 535 and host 540 using a wireless protocol. For example, mouse 550 and keyboard 55 may have been paired with host 535 and host 540 using any suitable protocol such as Bluetooth®, BLE, Wi-Fi®, near-field communication protocol, or the like. In this example, mouse 550 and keyboard 555 are currently connected to host 540. Keyboard 560 may also have been paired with host 535 and host 540 using a suitable protocol. However, keyboard 560 has an option on whether to join or not join group 545. In this example, keyboard 560 opted not to join group 545, such as by disabling a group connect feature of the application. In this example, keyboard 560 is currently connected to host 535.

When pairing the wireless peripheral devices, the connection information used during the pairing may be identical to the BLE address of the host. Accordingly, the connection information associated with group 520 is different than the connection information associated with group 545 because they are paired with different hosts. Thus, the advertisement packet of a wireless peripheral device of group 520, such as when switching to a different host may not affect another wireless peripheral device of group 545 even when both groups are proximate to each other.

Figure 6:
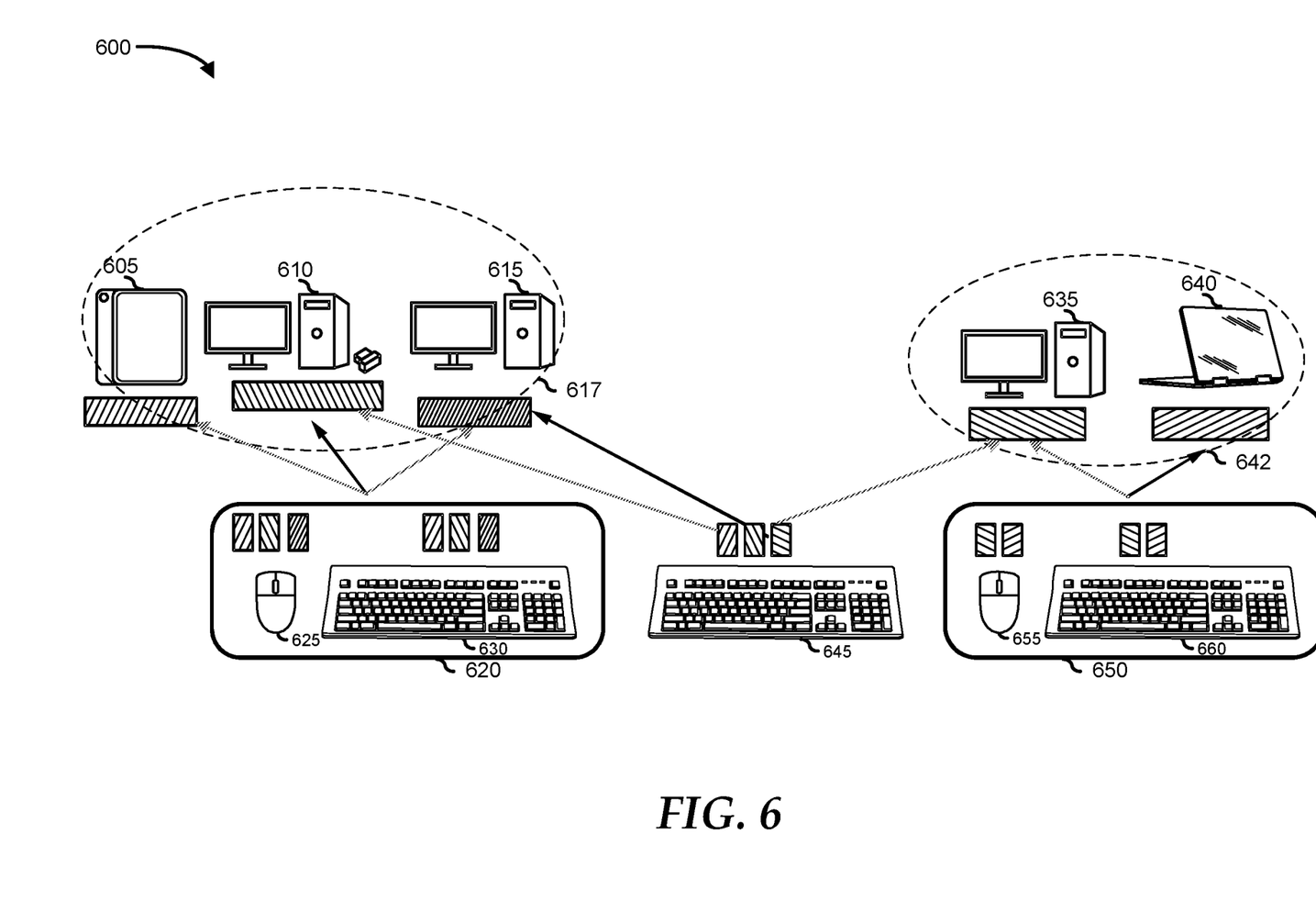
FIG. 6 is a block diagram illustrating an environment configured for channel switching mechanism among wireless peripheral devices, according to an embodiment of the present disclosure.

FIG. 6 shows an environment 600 with a host switching mechanism among wireless peripheral devices. In this example, environment 600 includes a set of hosts 617 and a set of hosts 642. Environment 600, which is similar to environment 500 of FIG. 5, also includes a group of wireless peripheral devices 620 (also referred to as group 620), a keyboard 645, and a group of wireless peripheral devices 650 (also referred to as group 650). Set of hosts 617 includes a host 605, a host 610, and a host 615. Set of hosts 642 includes a host 635 and a host 640. Group 620 includes a mouse 624 and a keyboard 630. Group 650 includes a mouse 655 and a keyboard 660. In this example, both the mice and keyboards depicted herein are wireless peripheral devices.

In this example, mouse 625 and keyboard 630 are both paired as a group with host 605, host 610, and host 615. Further, mouse 655 and keyboard 660 are both paired as a group with host 635 and host 640. In addition, keyboard 645 is paired with host 610, host 615, and host 635. This example, illustrates a wireless peripheral device, such as keyboard 645 that is paired with hosts which belong to different sets of hosts. Accordingly, keyboard 645 may not be allowed to join group 620 or group 650, as only wireless peripheral devices with identical paired channels can be joined in one group.

Figure 7:
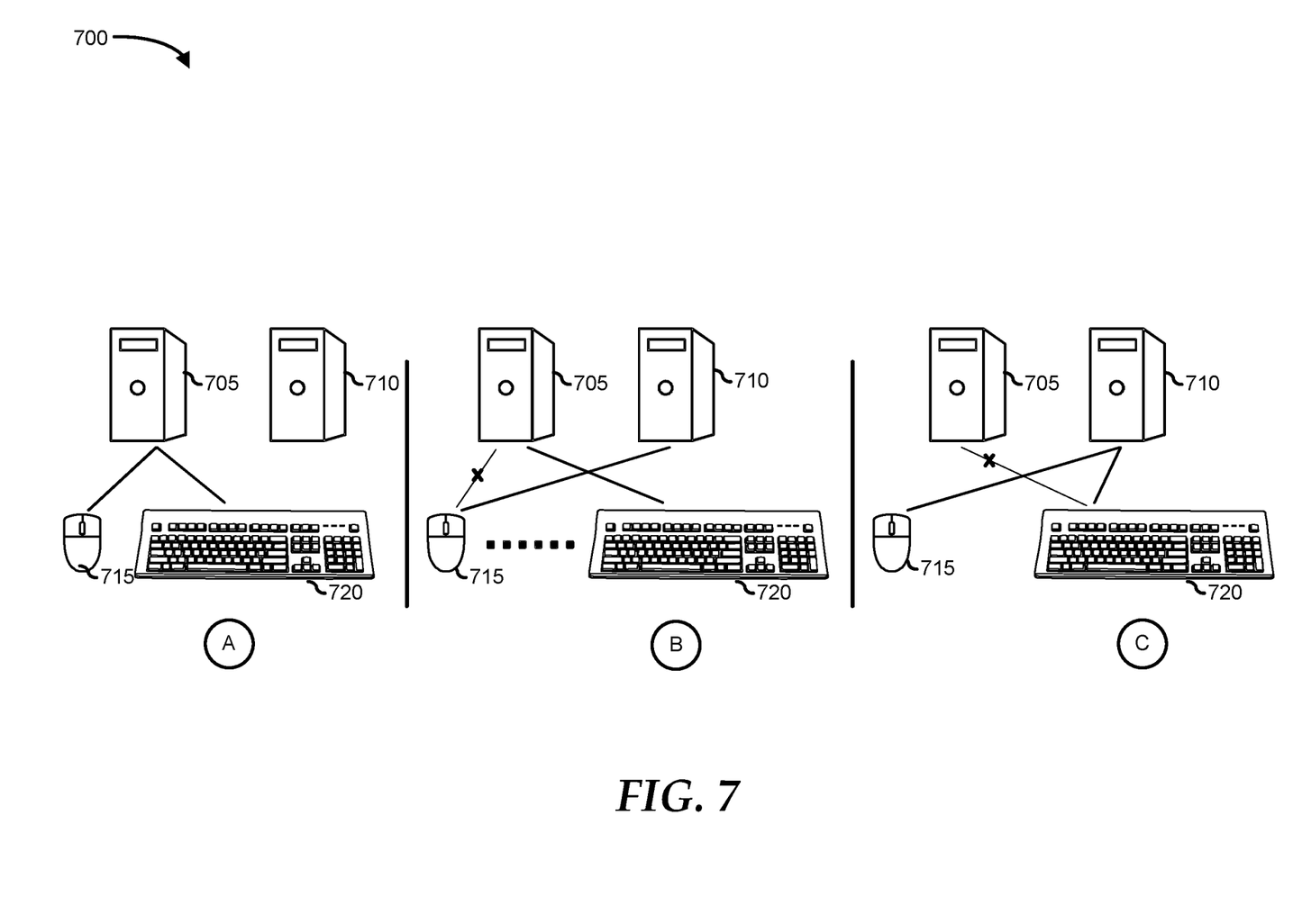
FIG. 7 is a block diagram illustrating a channel switching mechanism among wireless peripheral devices, according to an embodiment of the present disclosure.

FIG. 7 shows an environment 700 with a host switching mechanism among wireless peripheral devices. Environment 700, which is similar to environment 400 of FIG. 4, includes a mouse 715 and a keyboard 720 that are wireless peripheral devices that are associated or paired with host 705 and host 710 which are similar to hosts 305 of FIG. 3. FIG. 7 is annotated with a series of letters A, B, and C. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, both mouse 715 and keyboard 720 may be connected to host 705. Prior to stage A, both mouse 715 and keyboard 720 may have been paired with host 705 and host 710. In this example, mouse 715 and keyboard 720 may or may not have been paired as a group with the aforementioned hosts. At stage B, a user presses the channel switching button on mouse 715 which may trigger or initiate one or more events. First, the connection of mouse 715 from host 705 may be removed and a connection to host 710 initiated. Second, a central role functionality of mouse 715, which may have been suspended or inactive, may be activated. Accordingly, mouse 715 may start scanning or listening to and receiving advertisement packets. Mouse 715 may also transmit a channel switching request to the wireless peripherals in the group of those proximate to its location. In addition, keyboard 720 assumes a peripheral role, wherein keyboard 720 may start to periodically transmit advertisement packets, which can be undirected or directed advertisements. Third, a peripheral device signaling protocol, such as a BLE peripheral device signaling protocol, located in the firmware of mouse 715 may be started.

At stage C, keyboard 720 may receive the channel switching request transmitted by mouse 715. Keyboard 720 may confirm the host address in the channel switching request with the host address of the hosts that it has been paired to. For example, keyboard 720 may match the host address of host 710 in the channel switching request to the host address of host 710 that it initially was paired to. After confirmation that the host address matched, keyboard 720 may disconnect from host 705 and connect to host 710. Once keyboard 710 has successfully connected to host 710, the central host functionality of mouse 715 and the peripheral device signal protocol, may be suspended or stopped.

In this example, the user may perform a user manipulation, such as powering on mouse 715 or manually pressed the channel switching button on mouse 715, and stages A, B, and C are described based on that scenario. However, the user may have manually pressed the channel switching button on keyboard 720 instead of on mouse 715. Accordingly, the roles and/or functionality of mouse 715 and keyboard 720 may be reversed. In addition, the present disclosure is not limited to the usage of a mouse and/or a keyboard. Other wireless peripheral devices, such as a headset, trackpad, etc. may perform the functions of mouse 715 and/or keyboard 720 as described herein.

Figure 8:
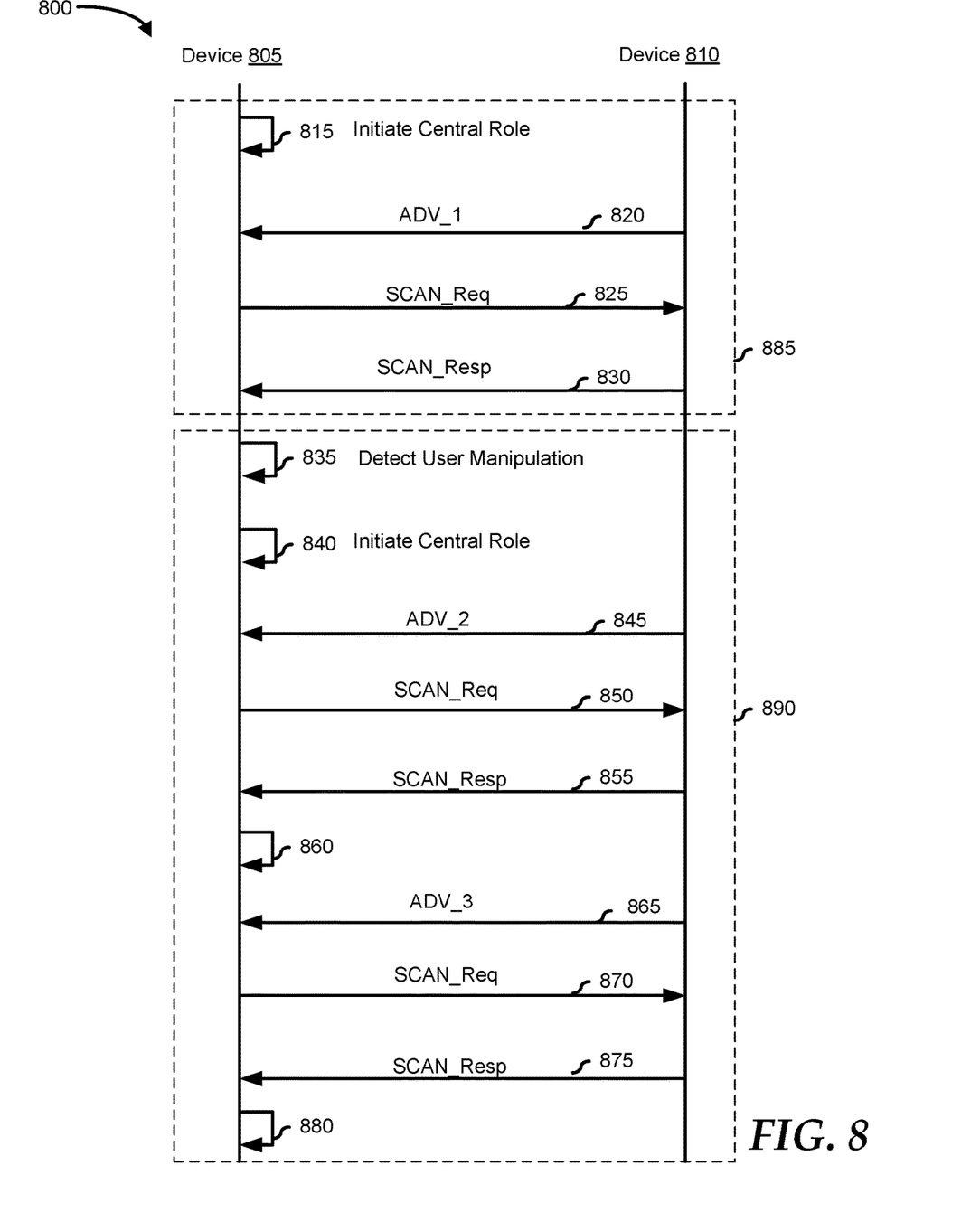
FIG. 8 is a diagram illustrating a sequence of channel switching mechanisms among wireless peripheral devices, according to an embodiment of the present disclosure.

FIG. 8 is a diagram of sequence 800 illustrating a channel switching mechanism among wireless peripheral devices. Sequence 800 is divided into two sub-systems, block 885 and block 890. Block 885 includes operations during a group identification process, such as operations 815, 820, 825, and 830. Prior to block 885, device 805 may have paired with one or more hosts in its proximity. Pairing is performed to establish keys that can be used to encrypt a link in the future reconnection, verify signed data, etc.

Device 805 and/or device 810 which are wireless peripheral devices may be paired to a host using a pairing mechanism that includes legacy pairing, limit input device, numeric input devices, alpha-numeric input device, and secure simple pairing for Bluetooth® devices. For wireless peripheral devices, the device may transmit an advertising packet to the host and/or a device with a central role. The advertising packet may include a payload used with data that describes the device and its capabilities. An exchange of security features may also be performed between the host and the peripheral device and or the device with the central role and other peripheral devices. The security features may include key exchange, I/O capabilities, requirements for man-in-the-middle protection, etc. The keys can be used to encrypt a link in future reconnections, verify signed data, or perform random address resolution. Subsequent connections may be configured to proceed automatically once the two devices or once the device and host are bonded.

Block 890 includes operations, such as operations 835, 840, 845, 850, 855, 860, 865, 870, 875, and 880, during a channel switching process. These operations may be performed when a wireless peripheral device detects a signal to switch to a different channel or host, which is typically initiated via user manipulation. Although both devices 805 and device 810 may assume either a central or a peripheral role, in this example, device 805 assumes the central role while device 810 may assume the peripheral role.

At operation 815, device 805 assumes the central role during the pairing process. At this point, device 805 scans for peripherals that are currently advertising. At operation 820, device 810 may periodically transmit an advertising packet to device 805. The advertising packet may indicate that it is up and ready to receive connections. Device 810 may transmit the advertising packet at particular intervals to specific channels on which device 805 is listening. In this example, the advertising packet may refer to an advertising indication packet, a non-connectible advertising indication, or a discoverable advertising indication packet. The advertising packet may include one or more host addresses, such as a BLE device address, a radio frequency (RF) dongle address, etc., that may have been paired with device 810. In one particular example, the advertising packet may include an XOR of six-byte of paired Bluetooth® host addresses, wherein the byte value may be zero if the host address does not exist. Thus, in one non-limiting example, ADV_1 may be equal to <BLE host address 1> XOR <BLE host address 2> XOR <RF dongle address>.

Upon receipt of the advertising packet, device 805 may compare the paired hosts of device 810 to the hosts it is paired with. If the hosts that device 805 is paired to are identical to the hosts that device 805 is paired to, then both devices may be grouped. At operation 825, device 805 may transmit a scan request to device 810. Device 805 may then enter a waiting state for a scan response packet from device 810. The scan request may include the address of device 805. At operation 830, device 810 may transmit a scan response that includes the device identifier and/or address of device 810 to device 805. The scan response may also include the addresses of the paired hosts associated with device 810. Upon receipt of the scan response, device 805 may compare the paired hosts of device 810 with its paired hosts. If the paired hosts are identical, device 805 may include device 810 in its group. At this point, device 805 may also suspend its central role.

At operation 835, device 805 may be performed in response to a trigger signal that may have been generated in response to a user's manipulation, such as pressing a button, a switch, a touch screen, activating a voice-activated device, performing a gesture at a gesture sensing device, etc. The user's manipulation may also include powering on a wireless peripheral device subsequent to pairing it with the information handling system, such as pressing a power button on the wireless peripheral device. Further, the user's manipulation of the device may also include moving the wireless peripheral device or touching a component of the wireless peripheral device which may affect the state of the device, such as to transition from a sleep to a wake mode. For example, the user may move a wireless mouse from side to side or press a key on the keyboard, adjusting the volume on a speaker, pressing a button on a wireless controller or joystick, inserting a dongle associated with the device, etc. For example, the user may press a control switch button on device 805 to switch the connection from a first host to a second host. The trigger signal may also be based on a combination of the user's manipulation. At operation 840, device 805 may initiate the central role and start listening for advertising packets from wireless peripheral devices within its group. In another embodiment, if the user manipulation is detected in device 810, then device 810 may initiate the central role. The central role of a device is time-bound. As such, the channel switching mechanism of the other peripheral devices may also be time-bound. The time limit may be at least one second or more.

At operation 845, device 810 may transmit an advertising packet similar to the advertising packet transmitted at operation 820. Upon receipt of the advertising packet, device 805 may determine whether the host addresses in the advertising packet are identical to their paired host addresses. If the host addresses are identical, device 805 may proceed to operation 850. At operation 850, device 805 may transmit a scan request to device 810, wherein the scan request is similar to the scan request transmitted at operation 825. Device 805 may then transition into a waiting state. The scan request may include the device address of device 805 and the device address of device 810, wherein the device addresses may be encrypted with the key generated earlier during the pairing process. At operation 855, device 810 may transmit a scan response to device 805. The scan response may include encrypted response data which may further include the next paired host address (host address of a previously paired host but device 810 is not currently connected to, referred to herein also as a target host address. The scan response may also include other information such as the number of desired iterations for reconnection, a vendor identifier, etc. The target host address may be a BLE host address of the host to be re-connected to.

At operation 860, upon receipt of the advertising packet, device 805 may authenticate the scan response received at operation 855. On successful authentication, device 805 may decrypt the encrypted information received to determine various information such as the target host address. Device 805 may compare the target host address to the host address that it is reconnecting to, that is device 805 is switching to. If it is a match, device 805 may perform operation 870. Otherwise, device 805 may transmit an error status or a request to retry to device 810. At operation 865, device 810 may transmit an advertising packet, which includes encrypted paired host addresses similar to operation 845. Device 810 may periodically transmit the advertising packet to device 810 or the channels that the device with the central role is listening to.

At operation 870, device 805 may transmit a scan request to device 810. The scan request may include a feedback code on whether the target host address matched, such as configured, no match, or cancel. The scan request may also include the host address that device 805 is switching to, as the target host address. Because a typical scan request packet does not have a data field, the target host address may be included in the advertising address of the protocol data unit instead of having an additional data payload. Accordingly, device 810 may be configured to analyze the advertising address to determine the target host address. If the feedback code is confirmed, then device 810 may switch to the target channel or host and transmit the status of the re-connection to device 805 at operation 875. At operation 875, device 810 may transmit a scan response to device 805. In addition to the confirmation, the scan response may also include the encrypted target host address and vendor identifier. Instead of confirmation, if there was an issue, the scan response may include a retry or cancellation status. Upon receipt of the scan response, device 805 may perform operation 880. At operation 880, device 805 may receive the scan response from device 810. Device 805 may determine the status of the channel or host switch. If the status is a confirmation of the channel or host switch of device 810, then device 805 may stop its central role and the peripheral device signaling protocol.

Figure 9:
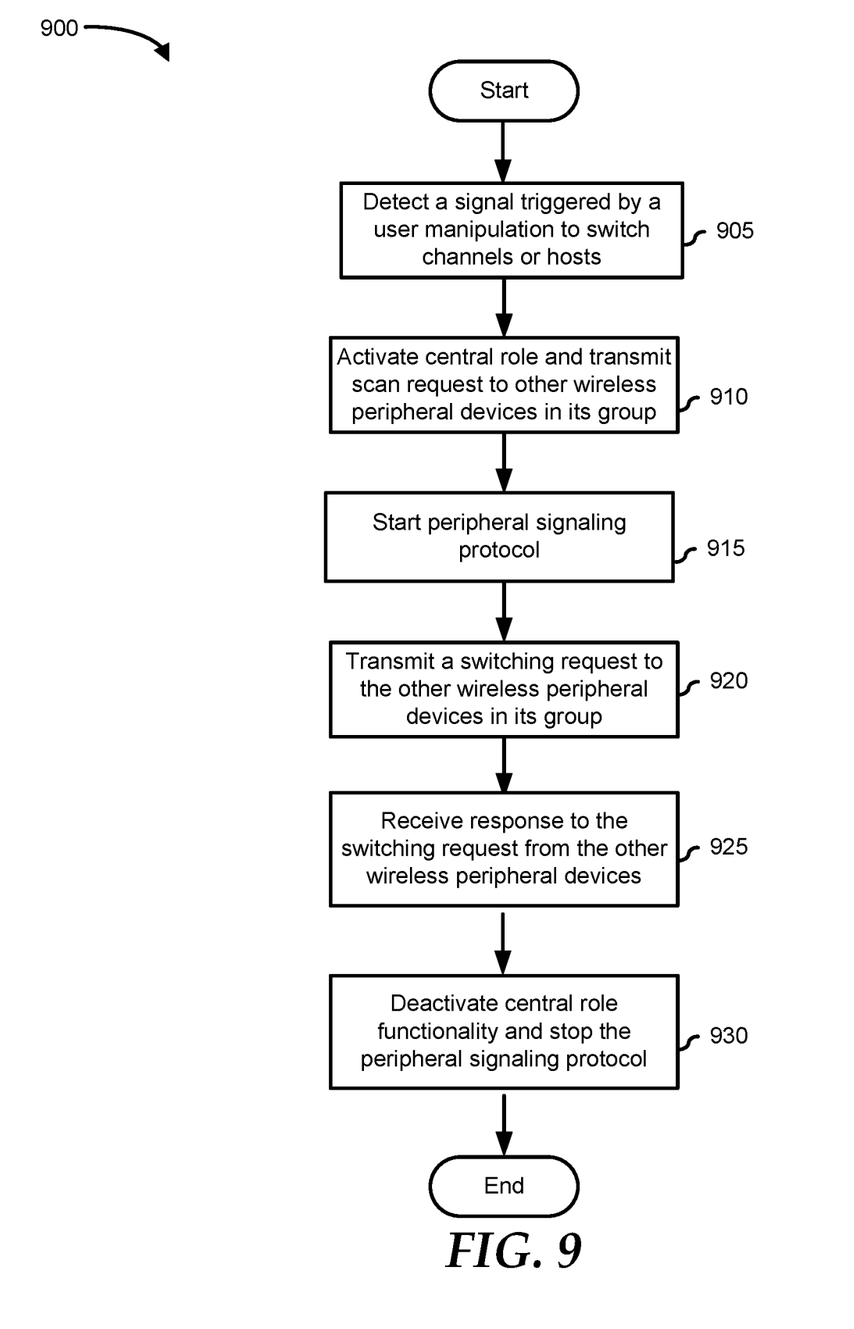
FIG. 9 is a flowchart illustrating a method of channel switching mechanisms among wireless peripheral devices, according to an embodiment of the present disclosure.

FIG. 9 shows a flowchart of method 900 for a channel switching mechanism among wireless peripheral devices. Method 900 typically starts at block 905 when a wireless peripheral device detects a signal that is triggered by a user manipulation for the wireless peripheral to switch to a different channel or host. Prior to block 905, the wireless peripheral device may have been paired to at least two hosts and is currently connected to one of the hosts. The wireless peripheral device may also belong to a group of wireless peripheral devices, wherein each of the wireless peripheral devices in the group may have been paired to identical hosts. The other wireless peripheral devices in the group are also currently connected to the same host as the wireless peripheral device.

At block 910, the wireless peripheral device activates its central role functionality and transmits a scan request to the other wireless peripheral devices in the group. The wireless peripheral device may also start listening for advertising packets from the other wireless peripheral devices in the group. At block 915, the wireless peripheral device starts a peripheral device signaling protocol, which may be a BLE peripheral device signaling protocol. At block 920, the wireless peripheral device transmits a switching request to the other wireless peripheral devices in the group. The switching request may include the address of the host to be switched to. The switching request may be part of a scan request.

At block 925, the wireless peripheral device may receive a response from each of the other wireless peripheral devices. The response may include the status of the switching request. For example, if one of the other wireless peripheral devices was successful in switching to the other host or channel, the said other wireless peripheral device may transmit a confirmation status. Otherwise, the status may be one of a retry, timeout, or cancellation. If the status is a retry, the wireless peripheral device may transmit another switching request to the other wireless peripheral device to retry. The wireless peripheral device may also wait for the response to the retry of the switching request. The wait may be time bound and if no response is received within the time limit, a timeout status may be transmitted. At block 930, the wireless peripheral device may deactivate its central role functionality and stop the peripheral device signaling protocol.

Although the example embodiment provided in the present disclosure includes switching from one host to another host, other applications of the present disclosure includes scenarios where it is needed or desirable for the wireless peripheral devices to communicate with each other such as when a mouse is running out of power and communicates its status to a keyboard which can then display the battery status via light-emitting diodes.

Although FIG. 9 show example operations, method 900 in some implementation, method 900 may include additional blocks, fewer blocks, different blocks, or differently arranged blocks than those depicted in FIG. 9. Those skilled in the art will understand that the principles presented herein may be implemented in any suitably arranged processing system. Additionally, or alternatively, two or more of the blocks of method 900 may be performed in parallel. For example, blocks 910 and 915 of method 900 may be performed in parallel.

As used herein, a hyphenated form of a reference numeral refers to a specific instance of an element and the un-hyphenated form of the reference numeral refers to the collective or generic element. Thus, for example, device "210-1" refers to an instance of a device class, which may be referred to collectively as devices "210" and any one of which may be referred to generically as a device "210."

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that causes a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   detecting, by a first wireless peripheral device, a signal triggered by a user manipulation to switch from a first host to a second host, wherein the first wireless peripheral device and a second wireless peripheral device are part of a group of peripheral devices that are currently connected to the first host; and
   in response to the detecting the signal, performing operations by the first wireless peripheral device, the operations including:
      initiating a central role and listening for an advertising packet from the second wireless peripheral device;
      disconnecting from the first host and re-connecting to the second host;
      subsequent from disconnecting from the first host, transmitting to the second wireless peripheral device a request to switch to the second host from the first host;
      receiving from the second wireless peripheral device a status of the switch from the first host to the second host, wherein the status is included in the advertising packet; and
      when the status is a confirmation of the switch from the first host to the second host, then stopping the central role.

2. The method of claim 1, wherein the user manipulation includes a user pressing a control switch button on the first wireless peripheral device.

3. The method of claim 1, wherein the user manipulation includes a user powering on the first wireless peripheral device.

4. The method of claim 1, wherein the first wireless peripheral device and the second wireless peripheral device are paired to identical hosts.

5. The method of claim 1, wherein the central role is time-bound.

6. The method of claim 1, wherein the operations further comprising determining whether a host address in the advertising packet is identical to a paired host address.

7. The method of claim 1, wherein the operations further comprising starting a wireless peripheral device signaling protocol.

8. A wireless communication system, comprising:
   a first wireless peripheral device; and
   a memory device storing to detect a signal triggered by a user manipulation to switch from a first host to a second host, wherein the first wireless peripheral device and a second wireless peripheral device are part of a group of peripheral devices that are currently connected to the first host;
   wherein in response to detecting the signal, the first wireless peripheral device:
      assumes a central role and listening for an advertising packet from the second wireless peripheral device:
      disconnects from the first host and re-connecting to the second host;
      subsequent from disconnects from the first host, transmits to the second wireless peripheral device a request to switch from the first host to the second host;

receives from the second wireless peripheral device a status of the switch from the first host to the second host, wherein the status is included in the advertising packet; and when the status is a confirmation of the switch from the first host to the second host, then un-assumes the central role.

9. The wireless communication system of claim 8, wherein the user manipulation includes a user pressing a control switch button of the first wireless peripheral device.

10. The wireless communication system of claim 8, wherein the first wireless peripheral device starts a peripheral device signaling protocol.

11. The wireless communication system of claim 8, wherein the first wireless peripheral device and the second wireless peripheral device are paired to identical hosts.

12. The wireless communication system of claim 8, wherein the central role is time-bound.

13. The wireless communication system of claim 8, wherein the first wireless peripheral device determines whether a host address in the advertising packet is identical to a paired host address.

14. The wireless communication system of claim 8, wherein in response to detecting the signal, the first wireless peripheral device further starts a wireless peripheral device signaling protocol.

15. A non-transitory computer-readable medium to store instructions that are executable to perform a method comprising:

detecting a signal triggered by a user manipulation to switch from a first host to a second host, wherein a first wireless peripheral device and a second wireless peripheral device are part of a group of peripheral devices that are connected to the first host; and in response to the detecting of the signal, directing the first wireless peripheral device to begin operations comprising:

assuming a central role and listening for an advertising packet from the second wireless peripheral device;

disconnecting from the first host and re-connecting to the second host;

subsequent from disconnecting from the first host, transmitting to the second wireless peripheral device a request to switch from the first host to the second host;

receiving from the second wireless peripheral device a status of the switch from the first host to the second host, wherein the status is included in the advertising packet; and when the status is a confirmation of the switch from the first host to the second host, then un-assuming the central role.

16. The non-transitory computer-readable medium of claim 15, wherein the user manipulation includes a user pressing a control switch button of the first wireless peripheral device.

17. The non-transitory computer-readable medium of claim 15, wherein the operations further comprise starting a peripheral device signaling protocol.

18. The non-transitory computer-readable medium of claim 15, wherein the first wireless peripheral device and the second wireless peripheral device are paired to identical hosts.

19. The non-transitory computer-readable medium of claim 15, wherein the central role is time-bound.

20. The non-transitory computer-readable medium of claim 15, wherein the operations further comprising starting a wireless peripheral device signaling protocol.

* * * * *